United States Patent
Shei et al.

(10) Patent No.: US 8,040,899 B2
(45) Date of Patent: Oct. 18, 2011

(54) METHODS, SYSTEMS, AND COMPUTER PROGRAM PRODUCTS FOR IMPLEMENTING AUTOMATIC PROTECTION SWITCHING FOR MEDIA PACKETS TRANSMITTED OVER AN ETHERNET SWITCHING FABRIC

(75) Inventors: Yen Shei, Plano, TX (US); David Z. Lu, Dallas, TX (US)

(73) Assignee: Genband US LLC, Plano, TX (US)

( * ) Notice: Subject to any disclaimer, the term of this patent is extended or adjusted under 35 U.S.C. 154(b) by 1001 days.

(21) Appl. No.: 11/139,019

(22) Filed: May 26, 2005

(65) Prior Publication Data
US 2006/0268686 A1 Nov. 30, 2006

(51) Int. Cl.
*H04L 12/28* (2006.01)
(52) U.S. Cl. .................................... 370/395.5
(58) Field of Classification Search .......... 370/216–218, 370/225, 229, 235, 236–236.2, 241, 242, 370/248, 250–252, 351, 389, 390, 392, 395.5, 370/395.1, 395.51–395.53, 395.6, 398
See application file for complete search history.

(56) References Cited

U.S. PATENT DOCUMENTS

| | | | |
|---|---|---|---|
| 5,818,842 A | 10/1998 | Burwell et al. |
| 5,938,732 A | 8/1999 | Lim et al. |
| 5,986,662 A | 11/1999 | Argiro et al. |
| 6,052,733 A | 4/2000 | Mahalingam et al. |
| 6,061,348 A | 5/2000 | Castrigno et al. |
| 6,111,880 A | 8/2000 | Rusu et al. |
| 6,154,445 A | 11/2000 | Farris et al. |
| 6,229,538 B1 | 5/2001 | McIntyre et al. |
| 6,272,113 B1 | 8/2001 | McIntyre et al. |
| 6,308,282 B1 | 10/2001 | Huang et al. |
| 6,363,497 B1 | 3/2002 | Chrabaszca |
| 6,381,218 B1 | 4/2002 | McIntyre et al. |
| 6,512,774 B1 | 1/2003 | Vepa et al. |

(Continued)

FOREIGN PATENT DOCUMENTS

WO WO 2005/033889 A2 4/2005

(Continued)

OTHER PUBLICATIONS

International Search Report and Written Opinion of the International Searching Authority corresponding to PCT application No. PCT/US06/20456 dated Oct. 20, 2006.

(Continued)

*Primary Examiner* — Derrick Ferris
*Assistant Examiner* — Omar Ghowrwal
(74) *Attorney, Agent, or Firm* — Jenkins, Wilson, Taylor & Hunt, P.A.

(57) ABSTRACT

Methods, systems, and computer program products for implementing automatic protection switching for media packets, such as ATM cells or IP packets that carry media content, in a device that includes an Ethernet switching fabric are disclosed. According to one method, first and second packet network interfaces of the device are configured to function as working and protection APS interfaces. At least one of a media processing resource and an Ethernet switch fabric of the device are configured to replicate egress media packets from the media processing resource to the working and protection APS interfaces. Egress media packets from the media processing resource are forwarded to the working and protection APS interfaces via the switch fabric. Ingress media packets received at the working APS interface are forwarded to the media processing resource via the Ethernet switch fabric. Media packets received at the protection APS interface are discarded.

41 Claims, 5 Drawing Sheets

U.S. PATENT DOCUMENTS

| | | | |
|---|---|---|---|
| 6,633,563 B1 | 10/2003 | Lin et al. | |
| 6,714,535 B1 | 3/2004 | Herh | |
| 6,728,780 B1 | 4/2004 | Hebert | |
| 6,738,826 B1 | 5/2004 | Moberg et al. | |
| 6,741,585 B1* | 5/2004 | Munoz et al. | 370/352 |
| 6,754,745 B1* | 6/2004 | Horvath et al. | 710/58 |
| 6,763,479 B1 | 7/2004 | Hebert | |
| 6,766,482 B1 | 7/2004 | Yip et al. | |
| 6,771,673 B1 | 8/2004 | Baum et al. | |
| 6,778,491 B1 | 8/2004 | Fourcand et al. | |
| 6,850,531 B1 | 2/2005 | Rao et al. | |
| 6,856,591 B1 | 2/2005 | Ma et al. | |
| 6,862,564 B1 | 3/2005 | Shue et al. | |
| 6,879,667 B1 | 4/2005 | Carew et al. | |
| 6,891,836 B1 | 5/2005 | Chen et al. | |
| 6,895,528 B2 | 5/2005 | Cantwell et al. | |
| 6,910,148 B1 | 6/2005 | Ho et al. | |
| 6,928,482 B1 | 8/2005 | Ben Nun et al. | |
| 6,938,092 B2 | 8/2005 | Burns | |
| 6,975,587 B1* | 12/2005 | Adamski et al. | 370/217 |
| 7,177,943 B1 | 2/2007 | Temoshenko et al. | |
| 7,185,094 B2 | 2/2007 | Marquette et al. | |
| 7,212,519 B2 | 5/2007 | Johnson et al. | |
| 7,233,567 B1* | 6/2007 | Li | 370/217 |
| 7,239,605 B2* | 7/2007 | Dinker et al. | 370/216 |
| 7,263,060 B1 | 8/2007 | Garofalo et al. | |
| 7,269,658 B2 | 9/2007 | Tao | |
| 7,289,487 B2 | 10/2007 | Jang | |
| 7,293,080 B1 | 11/2007 | Clemm et al. | |
| 7,424,025 B2 | 9/2008 | Qian et al. | |
| 7,681,069 B1* | 3/2010 | Chellappa et al. | 714/6 |
| 7,881,188 B2 | 2/2011 | Li et al. | |
| 7,911,940 B2 | 3/2011 | Shei | |
| 7,940,772 B2 | 5/2011 | Liu et al. | |
| 2001/0009550 A1 | 7/2001 | Mizuhara | |
| 2002/0012352 A1 | 1/2002 | Hansson et al. | |
| 2002/0016926 A1 | 2/2002 | Nguyen et al. | |
| 2002/0051464 A1 | 5/2002 | Sin et al. | |
| 2002/0174251 A1 | 11/2002 | Lasserre | |
| 2002/0191612 A1 | 12/2002 | Curtis | |
| 2003/0118039 A1 | 6/2003 | Nishi et al. | |
| 2003/0142795 A1 | 7/2003 | Gavette et al. | |
| 2003/0172319 A1 | 9/2003 | Ryhorchuk et al. | |
| 2003/0174729 A1* | 9/2003 | Heink et al. | 370/466 |
| 2004/0008722 A1 | 1/2004 | Ellis et al. | |
| 2004/0030757 A1 | 2/2004 | Pandya | |
| 2004/0066782 A1 | 4/2004 | Nassar | |
| 2004/0071142 A1 | 4/2004 | Moriwaki et al. | |
| 2004/0131064 A1 | 7/2004 | Burwell et al. | |
| 2005/0053073 A1* | 3/2005 | Kloth et al. | 370/395.41 |
| 2005/0165885 A1 | 7/2005 | Wong | |
| 2005/0185577 A1* | 8/2005 | Sakamoto et al. | 370/218 |
| 2005/0243716 A1* | 11/2005 | Bitar et al. | 370/218 |
| 2005/0281190 A1 | 12/2005 | McGee et al. | |
| 2006/0023736 A1 | 2/2006 | Boll et al. | |
| 2006/0143309 A1 | 6/2006 | McGee et al. | |
| 2006/0268888 A1 | 11/2006 | Liu et al. | |
| 2007/0076727 A1 | 4/2007 | Shei | |
| 2007/0083528 A1 | 4/2007 | Matthews et al. | |
| 2007/0183314 A1 | 8/2007 | Li et al. | |
| 2008/0317055 A1 | 12/2008 | Zetterlund et al. | |
| 2009/0092044 A1* | 4/2009 | Saito | 370/228 |
| 2011/0191624 A1 | 8/2011 | Rodgers et al. | |

FOREIGN PATENT DOCUMENTS

| | | |
|---|---|---|
| WO | WO 2005/034449 A1 | 4/2005 |
| WO | WO 2005/034454 A2 | 4/2005 |
| WO | WO 2006/127908 A2 | 11/2006 |

OTHER PUBLICATIONS

Commonly-assigned, co-pending U.S. Appl. No. To be Assigned for "Methods, Systems, and Computer Program Products for Transporting ATM Cells in a Device Having an Ethernet Switching Fabric," (Unpublished, filed May 26, 2005).

Martini, et al. "Encapsulation Methods for Transport of ATM Over MPLS Networks," Network Working Group, Internet Draft, (Apr. 2005).

Stern, et al. "Survivability: Protection and Restoration," Multiwavelength Optical Networks, p. 610-613, (May 1999).

Official Action for U.S. Appl. No. 11/138,990 (Sep. 4, 2008).

Notification of Transmittal of the International Search Report and the Written Opinion of the International Searching Authority, or the Declaration for International Application No. PCT/US06/20253 (Aug. 22, 2007).

Final Official Action for U.S. Appl. No. 11/138,990 (Apr. 13, 2009).

Non-Final Official Action for U.S. Appl. No. 11/138,990 (Oct. 28, 2009).

Communication pursuant to Rules 161 and 162 EPC for European Patent Application No. 04789383.9 (Sep. 24, 2008).

Notice of Allowance and Fee(s) due for U.S. Appl. No. 10/676,233 (May 2, 2008).

Official Action for U.S. Appl. No. 10/676,233 (Nov. 28, 2007).

Official Action for U.S. Appl. No. 10/676,233 (Jun. 11, 2007).

Communication pursuant to Rules 109 and 110 EPC for European Application No. 04789383.9 (Aug. 22, 2006).

International Search Report and Written Opinion for International Application No. PCT/US04/31920 (Mar. 4, 2005).

International Search Report and Written Opinion for International Application No. PCT/US04/31918 (Feb. 11, 2005).

Yoo et al., "A Media Stream Processing of VoIP Media Gateway," IEEE, pp. 91-94 (2003).

Interview Summary for U.S. Appl. No. 11/240,317 (Aug. 27, 2010).

Interview Summary for U.S. Appl. No. 11/240,317 (Jun. 22, 2010).

Final Official Action for U.S. Appl. No. 11/240,317 (Jun. 14, 2010).

Final Official Action for U.S. Appl. No. 11/138,990 (May 19, 2010).

Commonly-assigned, co-pending U.S. Appl. No. 12/700,444 for "Systems, Methods, and Computer Readable Media for Providing Instantaneous Failover of Packet Processing Elements in a Network," (Unpublished, filed Feb. 4, 2010).

Official Action for U.S. Appl. No. 11/702,009 (Jan. 13, 2010).

Official Action for U.S. Appl. No. 11/240,317 (Dec. 16, 2009).

Advisory Action for U.S. Appl. No. 11/240,317 (Oct. 8, 2009).

Final Official Action for U.S. Appl. No. 11/240,317 (Jun. 23, 2009).

Official Action for U.S. Appl. No. 11/702,009 (Apr. 17, 2009).

Official Action for U.S. Appl. No. 11/240,317 (Jan. 26, 2009).

Official Action for U.S. Appl. No. 11/240,317 (Jun. 23, 2008).

"FHRP—VRRP Enhancements," Cisco IOS Release 12.3(14)T, Cisco Systems, pp. 1-28 (Copyright 2005).

Hinden, "RFC 3768—Vitural Router Redundancy Protocol (VRRP)," Internet RFC/STD/FYI/BCP Archives, 20 pages (Apr. 2004).

Notice of Allowance and Fee(s) Due for U.S. Appl. No. 11/138,990 (Jan. 3, 2011).

Interview Summary for U.S. Appl. No. 11/138,990 (Oct. 26, 2010).

Notice of Allowance and Fee(s) Due for U.S. Appl. No. 11/240,317 (Oct. 1, 2010).

Notice of Allowance and Fee(s) Due for U.S. Appl. No. 11/702,009 (Sep. 20, 2010).

* cited by examiner

METHODS, SYSTEMS, AND COMPUTER PROGRAM PRODUCTS FOR IMPLEMENTING AUTOMATIC PROTECTION SWITCHING FOR MEDIA PACKETS TRANSMITTED OVER AN ETHERNET SWITCHING FABRIC

TECHNICAL FIELD

The subject matter described herein relates to automatic protection switching (APS). More particularly, the subject described herein relates to methods, systems, and computer program products for implementing automatic protection switching for media packets transmitted over an Ethernet switching fabric.

RELATED ART

In computer networks, automatic protection switching is a redundancy scheme in which data is redundantly transmitted over a working path and protection path between directly connected nodes. APS is commonly used in SONET networks to reduce the likelihood of loss of connectivity between two nodes when a fiber between two nodes is cut.

One common automatic protection scheme is a 1+1 automatic protection scheme in which a protection facility is provided for every working facility, and the working and protection facilities are on two physically diverse routes between the source and destination. Thus, if a fiber is cut, the signal uses the protection facility to reach the destination. The traffic is bridged permanently at the electrical level to both the working and protection facilities at the transmit end. At the receive end, the signals arrive from both facilities, and the received signals are continuously monitored for failures. The receiving equipment then selects the working signal under normal operations. In the event of a link failure on the working facility, an electrical switch at the receiver switches to the protection facility, thus restoring service with minimum outage time. In this scheme, because the signal is bridged at the source, head-end-to-tail-end signaling is not required.

FIG. 1 is a block diagram illustrating a conventional 1+1 protection scheme. In FIG. 1 a source 100 includes a bridge 102 that redundantly transmits data over working path 104 and protection path 106 to destination 108. Destination 108 includes a switch 110 that determines whether to use the data from working path 104 or protection path 106. The default mode of operation for a 1+1 system is nonrevertive mode in which the receiver does not switch back to the working facility after switching to the protection facility, even if the working facility is restored. In revertive mode, the system reverts to its original configuration after the fault is cleared.

1+1 protection schemes can be implemented in any suitable network devices. One type of network device in which it may be desirable to implement an APS scheme is a media gateway. Media gateways transmit bearer channel information, including voice, video, and other data between end users. For example, media gateways may be used for voice over IP telephone calls between end users. Since it is desirable that media gateways maintain active calls, even when a link fails, an APS scheme may be utilized.

One conventional media gateway formerly available from the assignee of the subject application as the SanteraOne® media gateway included an internal ATM switching fabric. The internal ATM switching fabric switched ATM cells and IP packets between ATM and IP network interfaces and voice server cards. In order to implement automatic protection switching, the ATM switching fabric can duplicate traffic to ATM network interfaces so that data could be redundantly transmitted to an adjacent node via the ATM interface. The voice server is not involved in the protection switching. The ATM cells are replicated to the ATM network interfaces in the egress direction. In the ingress direction, the ATM switching fabric selected the cells from the working link.

FIG. 2 is a block diagram illustrating the prior SanteraOne® media gateway architecture. In FIG. 2, media gateway 200 includes an ATM switching fabric 202 and a TDM matrix 204. ATM switching fabric 202 switches ATM cells between ATM network interfaces 206 and voice servers 208. ATM switching fabric 202 also switches IP packets between IP network interfaces 210 and voice servers 208 by segmenting and reassembling IP packets info ATM cells. As stated above, ATM switching fabric 202 implements automatic protection switching between ATM network interfaces 206 and voice servers 208. TDM matrix 204 switches voice channels between TDM network interfaces 212 and voice servers 208.

Since Ethernet switching equipment is less expensive than ATM switching equipment, it may be desirable to replace ATM switching equipment with Ethernet switching equipment. For example, a commonly assigned U.S. patent application entitled "Methods, Systems, and Computer Program Products for Transporting ATM Cells in a Device Having an Ethernet Switching Fabric," the disclosure of which is incorporated herein by reference in its entirety, is being filed on even date herewith. In the commonly assigned patent application, a media gateway with an Ethernet switching fabric is described. One problem with providing an Ethernet switching fabric is that unlike an ATM switching fabric, the Ethernet switching fabric does not provide a configuration option for automatic protection switching. Moreover, unlike ATM, which is a connection oriented protocol, Ethernet is connectionless, making the implementation of an APS scheme more difficult.

Accordingly, in light of these difficulties, there exists a need for improved methods, systems, and computer program products for implementing automatic protection switching in a device, such as a media gateway, that includes an Ethernet switching fabric.

SUMMARY

According to one aspect, the subject matter described herein includes a method for providing automatic protection switching in a device having an Ethernet switching fabric. The method may include configuring first and second packet network interfaces to function as working and protection APS interfaces. The packet network interfaces may be any suitable type of network interface for sending and receiving media packets over a network. Examples of such interfaces include ATM network interfaces, IP over Ethernet network interfaces, and packet over SONET network interfaces. The method may also include configuring at least one of a media processing resource and an Ethernet switch fabric to replicate egress media packets from the media processing resource to the working and protection APS interfaces. The media packets may be ATM cells or IP packets, depending on the type of network interface over which a media connection is established.

As used herein, the term "media processing resource" refers to a device or collection of devices that processes at least one of voice, video, and data transmitted between end users. An example of a media processing resource is a voice server in a media gateway.

At run time, egress media packets may be forwarded from the media processing resource to the working and protection APS interfaces via the Ethernet switching fabric. The working and protection APS interfaces may forward the egress media packets to the adjacent node over working and protection facilities. Ingress media packets may be received at the working and protection APS interfaces. Ingress media packets received at the working APS interface may be forwarded to the media processing resource via the Ethernet switch fabric. Ingress media packets received at the protection APS interface may be discarded. Alternatively, the ingress media packets received at the protection APS interface may also be forwarded to the media processing resource where they are discarded or ignored.

The subject matter described herein may be implemented using a computer program product comprising computer executable instructions embodied in a non-transitory computer readable medium. Exemplary computer readable media suitable for implementing the subject matter described herein include chip memory devices, disk memory devices, application specific integrated circuits, and programmable logic devices. Moreover, it is understood that a computer readable medium that implements the subject matter described herein may be distributed across multiple devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
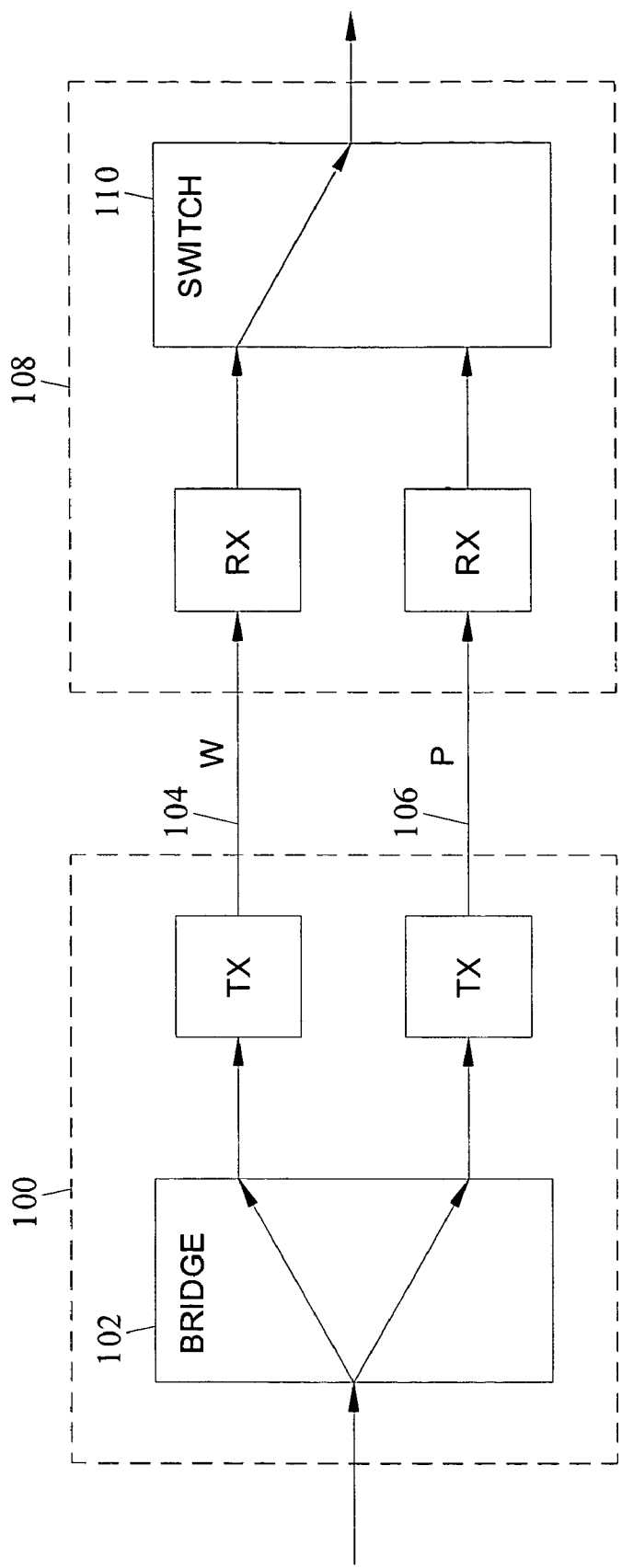
FIG. 1 is a block diagram illustrating a conventional 1+1 APS architecture.
Figure 2:
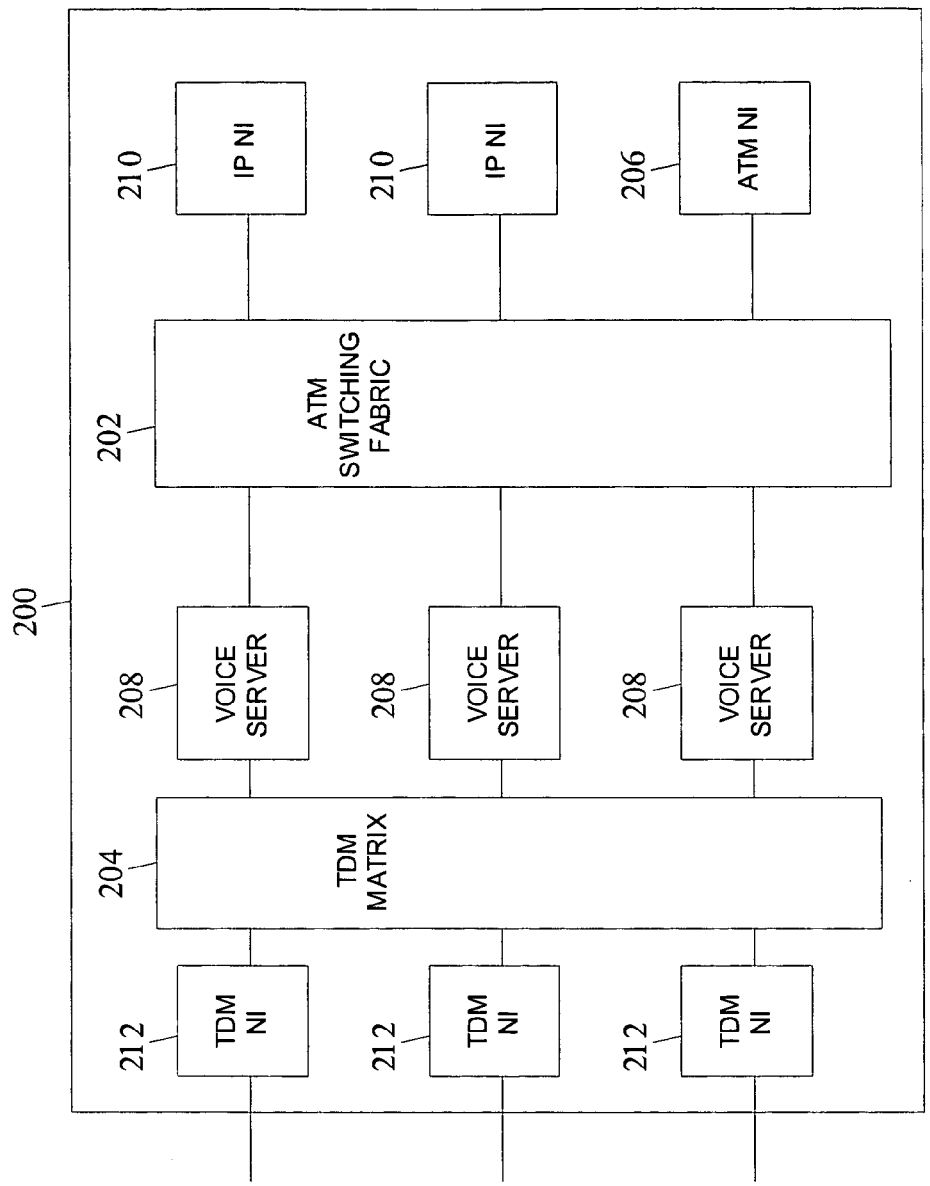
FIG. 2 is a block diagram illustrating a conventional media gateway architecture including an ATM switching fabric.
Figure 3:
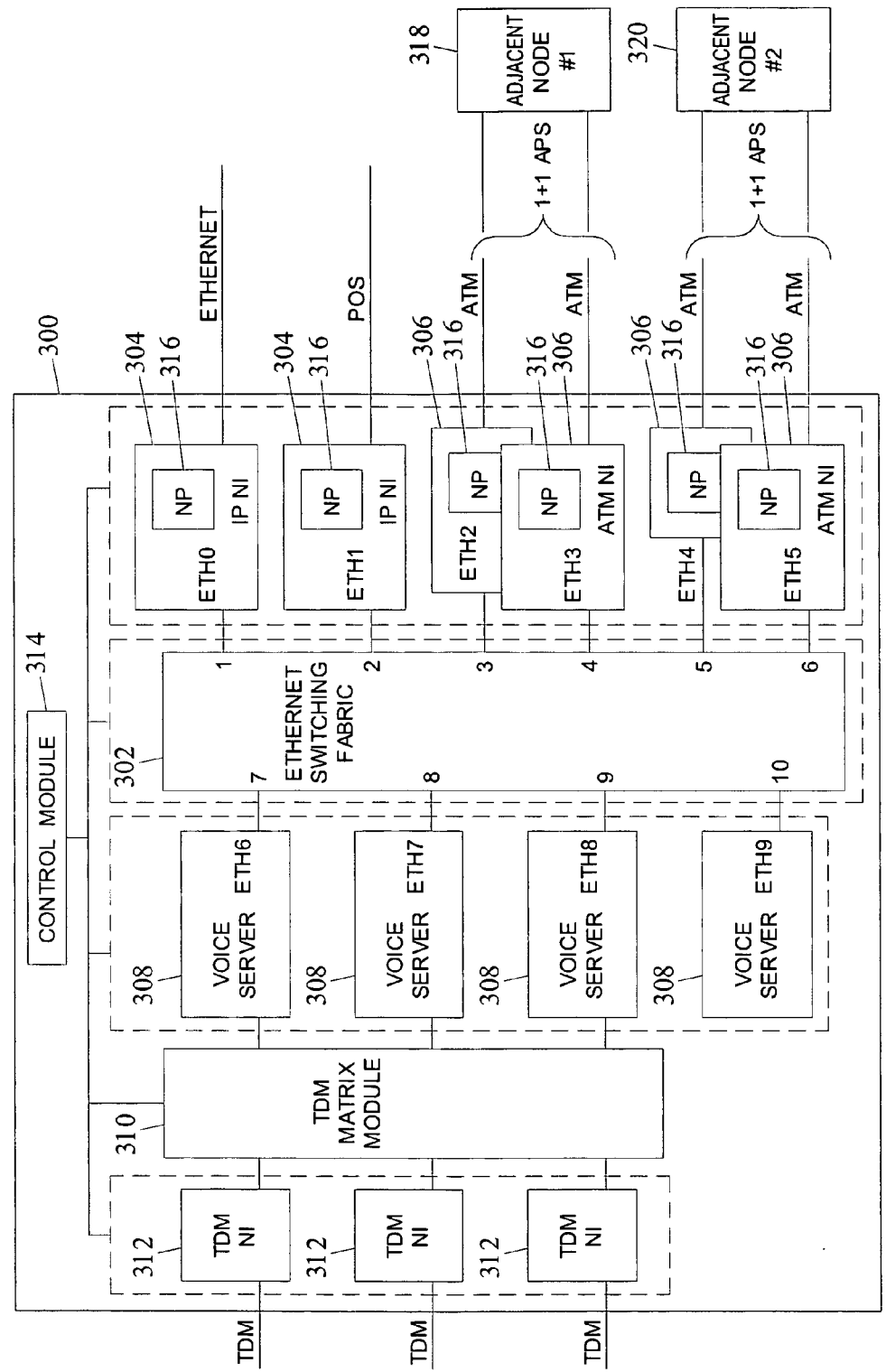
FIG. 3 is block diagram illustrating a media gateway including an Ethernet switching fabric and functionality for implementing automatic protection switching according to an embodiment of the subject matter described herein.

The subject matter described herein may be implemented in any suitable node that switches media packets, such as ATM cells or IP packets carrying voice, video, data, or other media type, and that includes an Ethernet switching fabric. Examples of such devices include media gateways, ATM switches, or other suitable devices that switch ATM cells and include an Ethernet switching fabric. In one exemplary implementation, automatic protection switching may be implemented in a media gateway that includes an Ethernet switching fabric. FIG. 3 is block diagram of a media gateway that includes an Ethernet switching fabric and that implements automatic protection switching for ATM network interfaces. Referring to FIG. 3, media gateway 300 includes an Ethernet switching fabric 302 that switches traffic between IP network interfaces 304, ATM network interfaces 306, and voice servers 308. As stated above, IP network interfaces 304 and ATM network interfaces 306 may generically be referred to as packet network interfaces. Media gateway 300 also includes a TDM matrix module 310 that switches voice channels between TDM network interfaces 312 and voice servers 308. Voice servers 308 perform media processing functions for communications between end users. For ATM cells that carry voice information, voice servers 308 may perform segmentation and reassembly operations. Voice servers 308 may also perform transcoding operations for voice calls. A control module 314 controls the overall operation of media gateway 300.

Ethernet switching fabric 302 may be any suitable Ethernet switch capable of switching traffic between ports. In one exemplary implementation, Ethernet switching fabric 302 may be implemented using a commercially available gigabit Ethernet switching fabric, such as those manufactured by Broadcom Corporation or Marvell Technology Group, Ltd. The specific model used may be selected based on the number of ports required by media gateway 300. For purposes of illustration, Ethernet switching fabric 302 is shown as having 10 ports numbered 1-10. It is understood that Ethernet switching fabric 302 would have more than 10 ports. However, 10 ports are shown in FIG. 3 because 10 different devices are connected to the ports.

IP network interfaces 304 each include functionality for sending and receiving media packets, such as voice packets, over an IP network. In order to interface with Ethernet switching fabric 302, each IP network interface 304, ATM network interface 306, and voice server 308 may include an Ethernet transceiver that connects to a corresponding port of switching fabric 302.

ATM network interfaces 306 receive ATM cells from the network, forward the ATM cells to an assigned voice server 308 via Ethernet switching fabric 302, receive ATM cells from voice servers 308 via Ethernet switching fabric 302, and forward the ATM cells over the network. In the illustrated example, each ATM network interface 306 includes a network processor 316. Network processors 316 perform VPI/VCI translations, encapsulate ingress ATM cells in Ethernet frames, receive Ethernet frames from Ethernet switching fabric 302, and extract egress ATM cells from the Ethernet frames. IP network interfaces 304 may also include network processors 316, which may perform IP forwarding functions.

In the illustrated implementation, each pair of ATM network interfaces 306 forms an APS protection group. For example, one ATM interface of each pair of ATM network interfaces may be a working interface and the other may be a protection interface. Two protection groups are shown in FIG. 3, one for adjacent node 318 and another for adjacent node 320. The working interface of each protection group forwards ingress ATM cells to voice servers 308 over Ethernet switching fabric 302. Voice servers 308 may be assigned to new connections based on relative voice server utilization, as described in commonly-assigned, co-pending U.S. patent application Ser. No. 10/676,233, filed Oct. 1, 2003, the disclosure of which is incorporated herein by reference in its entirety. Both the working and protection APS interfaces may maintain identical connection tables that keep track of the voice servers assigned to different connections. The protection interface of each protection group may discard ingress ATM cells. Alternatively, the ingress ATM cells received at the protection APS interface may be forwarded to a voice server where they are discarded or ignored. For egress ATM cells, both the working and protection interfaces forward the ATM cells to the adjacent node.

The status of the working and protection links may be monitored by physical layer hardware, such as SONET hardware, on each ATM network interface. If the signal quality of the working interface falls below a predetermined threshold, the protection APS interface may become the working APS interface, and the former working interface may cease to forward ingress traffic. If a revertive mode of operation is implemented, the roles of the protection and working interfaces may be restored when the signal associated with the working interface is restored. If a non-revertive mode of operation is implemented, once the protection interface becomes the working interface, the protection interface will not switch back to protection mode when the signal associated with the working interface is restored. Either mode of operation is intended to be within the scope of the subject matter described herein.

Since Ethernet switching fabrics are not pre-configured to implement automatic protection switching, Ethernet switching fabric 302 must be configured to support automatic protection switching for the ATM interfaces. In one exemplary implementation, Ethernet switching fabric 302 may be configured to recognize a multicast Ethernet address for each protection group and to multicast Ethernet frames addressed to the multicast address to ATM network interfaces that are members of each protection group. In FIG. 3, the ATM network interfaces corresponding to Ethernet addresses Eth2 and Eth3 may be one protection group and the ATM network interfaces corresponding to Ethernet addresses Eth4 and Eth5 may be another protection group. In a multicast implementation with two protection groups, as illustrated in FIG. 3, switching fabric 302 may be configured to recognize two multicast addresses, one for the devices connected to ports 3 and 4 and another for the devices connected to ports 5 and 6. Implementing any number of protection groups is intended to be within the scope of the subject matter described herein.

In alternate implementation, in order to implement automatic protection switching, the port mirroring capability of Ethernet switching fabric 302 may be utilized. Port mirroring is inherent capability of some Ethernet switching fabrics. According to this feature, Ethernet frames sent to one port may be automatically replicated to another port. Thus, port mirroring may be configured for ports 3 and 4 and ports 5 and 6. One limitation of using port mirroring to implement automatic protection switching is that some Ethernet switching fabrics may only allow port mirroring for a single pair of ports.

In yet another alternate implementation, Ethernet switching fabric 302 may be configured to recognize protection group virtual local area network (VLAN). For example, a separate VLAN may be defined for each protection group. When a voice server desires to send an Ethernet frame containing ATM cells to a protection group, the voice server may send the frame to the protection group VLAN with a broadcast MAC address. Ethernet switching fabric 302 will then broadcast the frame to all the members of the protection group VLAN.

As stated above, voice servers 308 perform voice processing functions for incoming media packets. For example, voice servers 308 may perform segmentation and reassembly of ATM cells and perform voice processing functions, such as transcoding. In order to implement APS, voice servers 308 may be configured to match the APS implementation of Ethernet switching fabric 302. For example, if a multicast scheme is implemented, voice servers 308 may be configured to address Ethernet frames intended for protection groups to the multicast address of each group. If port mirroring is used to implement APS, voice servers 308 may be configured to address frames to the Ethernet address of one of the members of the protection group. Ethernet switching fabric 302 will then copy the frame to the other member of the protection group connected to the mirrored port. If a VLAN implementation is utilized, voice servers 308 may be configured to send frames intended for protection groups to the VLAN of the protection group and to a broadcast Ethernet address within the VLAN.

Figure 4:
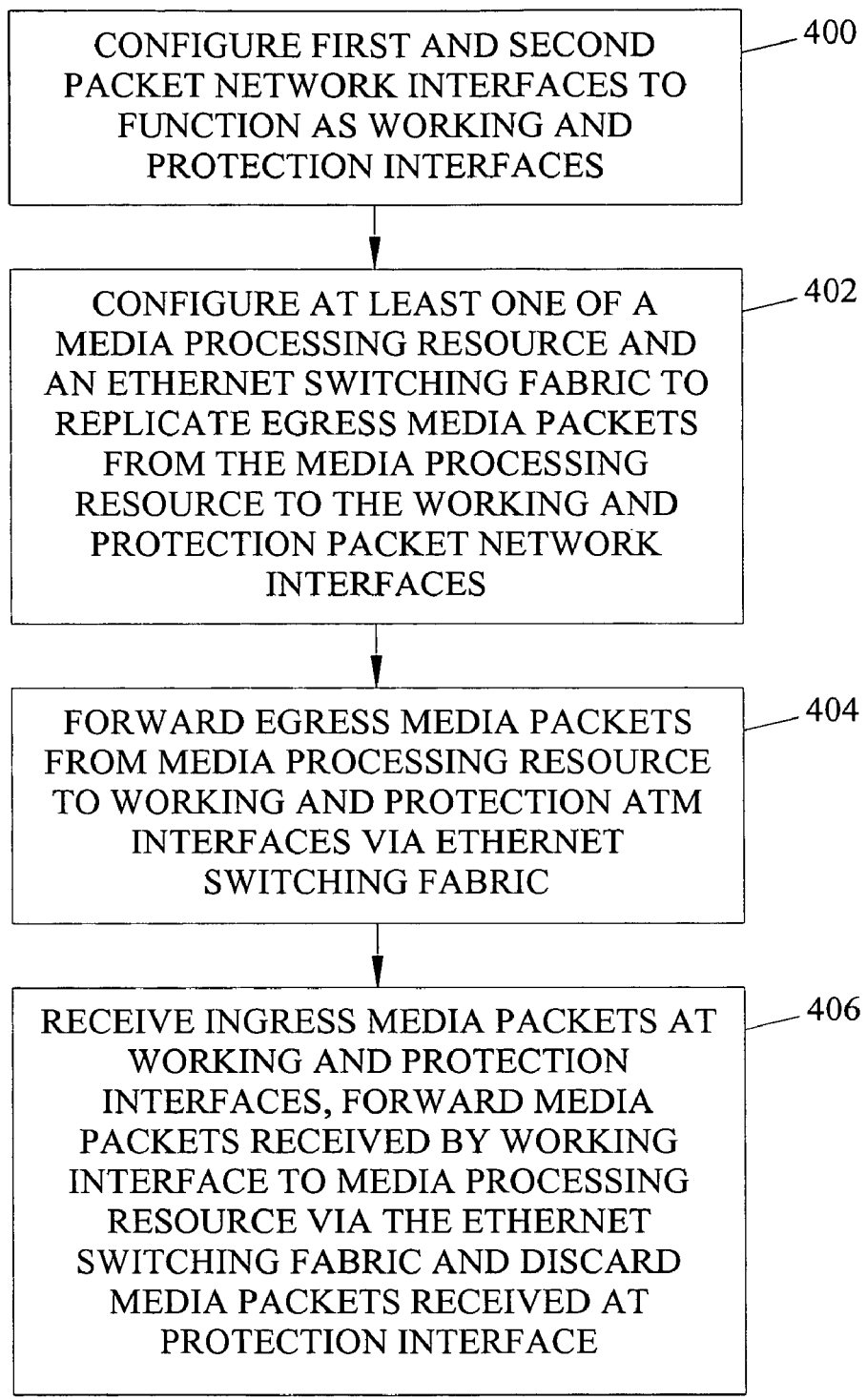
FIG. 4 is flow chart illustrating exemplary steps for implementing automatic protection switching for packet network interfaces of a media gateway according to an embodiment of the subject matter described herein.

FIG. 4 is a flow chart illustrating exemplary steps for implementing automatic protection switching for media packets in a device including an Ethernet switching fabric according to an embodiment of the subject matter described herein. Referring to FIG. 4, in step 400, first and second ATM network interfaces are configured to function as working and protection APS interfaces. This step may include configuring one interface of the group as a working interface and another interface of the group as a protection interface. Configuring one interface of the group as the working interface may include configuring that interface to forward frames to a media processing resource assigned to a connection. Configuring the other interface of the group as the protection interface may include configuring that interface to discard incoming Media packets. However, configuring the protection interface may also include configuring the protection interface with the same connection table as the working interface so that the protection interface can be switched to working mode with minimal delay. Both the working and protection interfaces may be configured to send egress Media packets to the adjacent node.

In step 402, at least one of a media processing resource 308 and Ethernet switching fabric 302 is configured to replicate egress media packets from the media processing resource to the working and protection APS interfaces. In the multicast implementation described above, each voice server 308 may be configured to send media packets intended for protection group to the multicast address of the protection group. Ethernet switching fabric 302 may be configured to recognize the multicast address of the protection group and replicate frames to each group member. In the port mirroring implementation described above, each voice server 308 may be configured to address frames directly to either member of a protection group. Ethernet switching fabric 302 may then be configured to copy or replicate frames to the port for which mirroring is configured. In the VLAN implementation described above, each voice server 308 may be configured with the VLAN corresponding to each protection group, and Ethernet switching fabric 302 may be configured to replicate frames to all interfaces that are members of the VLAN.

In step 404, at run time, ingress media packets are forwarded from the media processing resource to the working and protection APS interfaces via Ethernet switching fabric 302. In step 406, ingress media packets are received at the working and protection APS interfaces. Media packets received at the working APS interface are forwarded to the media processing resource. Media packets received at the protection APS interface may be discarded.

Figure 5:
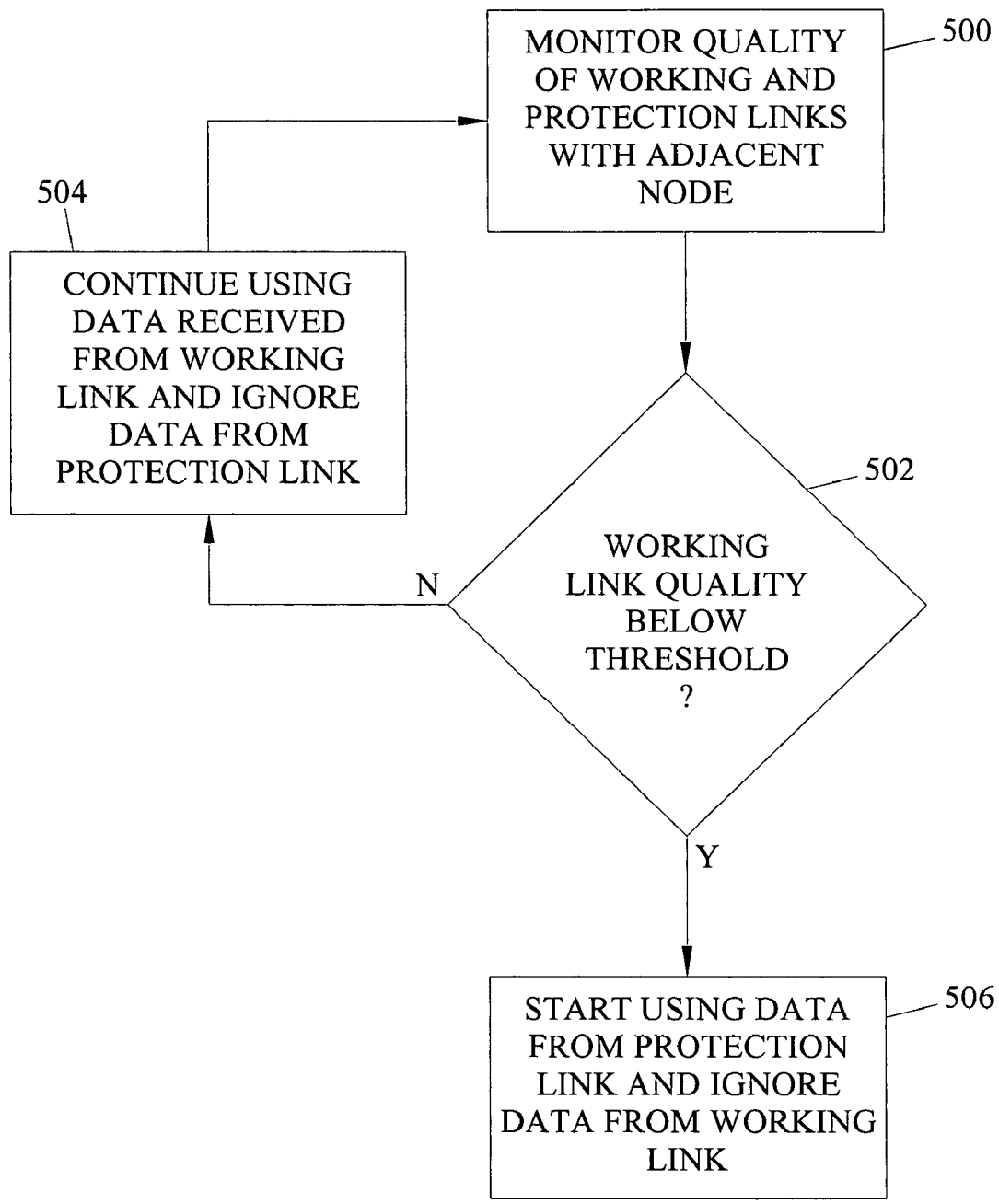
FIG. 5 is a flow chart illustrating exemplary steps that may be performed in switching between working and protection links in APS implementation according to an embodiment of the subject matter described herein.

FIG. 5 is flow chart illustrating exemplary steps for switching between working and protection interfaces in response to a signal failure. Referring to FIG. 5, in step 500, quality of working and protection links with adjacent node is monitored. This step may be performed in hardware at each packet network interface in a protection group. The packet network interfaces may communicate directly with each other to exchange link quality information. Alternatively, the packet network interfaces may each communicate link quality information to a supervisory processor, such as control module 314 illustrated in FIG. 3. In step 502, it is determined whether the working link quality falls below an acceptable threshold. If the working link quality is above the acceptable threshold, control proceeds to step 504 where the device continues to use data received from the working link and ignores data received from the protection link.

In step 502, if it is determined that the protection link quality falls below the acceptable threshold, control proceeds to step 506 where the device starts using data from the protection link and ignores data received from the working link. In other words, in step 506, the protection link becomes the working link.

As described above, in one embodiment of the subject matter described herein, automatic protection switching may be implemented by configuring the voice servers and Ethernet switching fabric to multicast Ethernet frames containing media packets to members of a protection group. Table 1 show below illustrates exemplary switch fabric destination MAC address to port mappings for the multicast APS implementation. All tables assume switch fabric port identifiers and card Ethernet addresses shown in FIG. 3.

TABLE 1

Switch Fabric Destination MAC Address to Port Mappings for Multicast APS Implementation

| Destination MAC Address | Ethernet Switching Fabric Output Port |
|---|---|
| Eth0 | 1 |
| Eth1 | 2 |
| Eth2 | 3 |
| Eth3 | 4 |
| Eth4 | 5 |
| Eth6 | 7 |
| Eth7 | 8 |
| Eth8 | 9 |
| Eth9 | 10 |
| MCAST1 | 3 |
|  | 4 |
| MCAST2 | 5 |
|  | 6 |

In Table 1, the left hand column includes destination MAC addresses for each device connected to Ethernet switching fabric 302. The right hand column includes the Ethernet switching fabric port to which each device is connected. The last two entries in the left hand column of Table 1 are multicast Ethernet addresses. It can be seen that if an Ethernet frame has a multicast address MCAST1 the Ethernet frame will be output to ports 3 and 4. Referring back to FIG. 3, ports 3 and 4 of Ethernet switching fabric 302 correspond to ATM network interfaces of one the APS groups. Similarly, in Table 1, Ethernet frames addressed to the multicast address MCAST2 are replicated to switching fabric output ports 5 and 6. In FIG. 3, ports 5 and 6 correspond to members of the second protection group.

In order to implement APS for ingress packets, each ATM interface that is a member of a protection group may include a connection table that maps VPI/VCI values in ATM cells to the Ethernet interface associated with the voice server to which the cells are destined. The table may also include internal VPI/VCI mappings. Table 2 shown below illustrates exemplary VPI/VCI to voice server MAC address mappings for ingress ATM cells at an ATM network interface.

TABLE 2

VPI/VCI to Voice Server MAC Address Mappings for Ingress ATM Cells at ATM Network Interface

| Network VPI/VCI | Voice Server MAC ADDR | Internal VPI/VCI |
|---|---|---|
| 1/1 | Eth6 | 1/32 |
| 1/2 | Eth6 | 1/33 |
| 1/3 | Eth6 | 1/34 |

In Table 2, the left hand column includes network VPI/VCI values. By network VPI/VCI values, it is meant that these are the VPI/VCI values used between adjacent nodes and media gateway 300. The center column in Table 2 includes the voice server MAC address to which the cells containing the VPI/VCI combinations in column 1 will be forwarded. The voice server may be dynamically assigned by control module 314 using any suitable criteria, such as relative voice server resource utilization, quality of service, etc. The right hand column in Table 1 includes internal VPI/VCI values to which the values in column 1 may be translated when the cells are sent to the voice server. The reason for translating VPI/VCI values is to ensure uniqueness across different network interfaces. The data illustrated in Table 2 may be included on both the working and protection interface in a protection group.

In order to properly route egress cells to both members of a protection group, each voice server 308 may include a table that maps VPI/VCI values to an appropriate Ethernet address so that switching fabric will send the cells to both the working and protection interfaces of each group. Table 3 shown below illustrates exemplary data that may be maintained by the voice server having the Ethernet address ETH6.

TABLE 3

Internal VPI/VCI to Destination MAC Address Mappings for Egress ATM Cells at Voice Server having Eth6

| Internal VPI/VCI | Destination MAC Address |
|---|---|
| 1/32 | MCAST1 |
| 1/33 | MCAST1 |
| 1/34 | MCAST1 |

In Table 3, the left hand column includes internal VPI/VCI values. The internal VPI/VCI values in Table 3 correspond to the internal VPI/VCI values in Table 2. The right hand column in Table 3 includes destination MAC addresses. Since all of the VPI/VCI values correspond to connections that originated in the protection group corresponding to MCAST1, the destination MAC address for the encapsulating Ethernet frame for cells having these VPI/VCI values should be MCAST1. Similar entries may be configured for VPI/VCI values corresponding to the protection group MCAST2.

In order to properly forward egress ATM cells over the network, each network interface may include internal to external VPI/VCI mappings. Table 4 shown below illustrates exemplary internal to network VPI/VCI mappings.

TABLE 4

Source MAC and Internal VPI/VCI to Network VPI/VCI Mappings for Egress ATM Cells at ATM NI

| Source MAC | Internal VPI/VCI | Network VPI/VCI |
|---|---|---|
| Eth6 | 1/32 | 1/1 |
| Eth6 | 1/33 | 1/2 |
| Eth6 | 1/34 | 1/3 |

The left hand column in Table 4 includes the source MAC address. The center column in Table 4 includes the internal VPI/VCI value. The right hand column in Table 4 includes the network VPI/VCI values to which the VPI/VCI values in column 2 will be translated before the cells are sent over the network. Tables such as Table 4 may be included at both the working and protection members of a protection group so that duplicate copies of each cell will be forwarded to the adjacent node.

In a port mirroring APS implementation, Ethernet switching fabric 302 may be configured to mirror Ethernet frames from one member of a protection group to the other member of the protection group. Table 5 shown below illustrates exemplary destination MAC address to switch fabric output port mappings for a port mirroring APS implementation.

TABLE 5

Destination MAC Address to Port Mappings for
Port Mirroring APS Implementation

| Dest MAC Address | Switch Fabric Output Port |
|---|---|
| Eth0 | 1 |
| Eth1 | 2 |
| Eth2 | 3 |
|      | 4 |
| Eth3 | 3 |
|      | 4 |
| Eth4 | 5 |
|      | 6 |
| Eth5 | 5 |
|      | 6 |
| Eth6 | 7 |
| Eth7 | 8 |
| Eth8 | 9 |
| Eth9 | 10 |

In Table 5, the left hand column includes the destination MAC address that should be inserted in Ethernet frames from a voice server that encapsulates egress ATM cells. The right hand column in Table 5 includes the switch fabric output port to which the Ethernet frames having the destination MAC addresses in the left hand column should be forwarded. In Table 5, it can be seen that Ethernet frames addressed to Ethernet addresses Eth2, Eth3, Eth4, and Eth5 are replicated to multiple ports. These addresses correspond to members of the protection groups illustrated in FIG. 3. As described above, some switch fabric architectures may allow only a single port to be mirrored. However, the implementation illustrated in Table 5 assumes no limitation on port mirroring.

In a port mirroring APS implementation, each voice server may be configured to properly address ATM cells to one or the other members of the protection group. Table 6 shown below illustrates exemplary internal VPI/VCI to destination MAC address mapping for egress ATM cells at the voice server corresponding to Ethernet address Eth 6 using port mirroring.

TABLE 6

Internal VPI/VCI to Destination MAC Address Mappings for Egress
ATM Cells at Voice Server Corresponding to Eth6 using Port Mirroring

| Internal VPI/VCI | Dest MAC Addr |
|---|---|
| 1/32 | Eth2 |
| 1/33 | Eth2 |
| 1/34 | Eth2 |

In Table 6, the first column includes internal VPI/VCI values. The second includes destination MAC addresses. In the illustrated example, internal VPI/VCI values corresponding to the VPI/VCI connections that originated on the ATM interface having the address Eth2 are encapsulated in Ethernet frames addressed to the ATM interface having the Ethernet address Eth2. Using the data in Table 5, Ethernet switching fabric 302 automatically replicates Ethernet frames addressed to Eth2 to the ATM network interface having the Ethernet address Eth3.

In VLAN APS implementation, switching fabric 302 preferable includes a table that maps VLAN tags to switch fabric output ports. Table 7 shown below illustrates exemplary destination MAC address to VLAN and port mappings for a VLAN APS implementation.

TABLE 7

Destination MAC Address and VLAN to Port Mappings
for VLAN APS Implementation

| Dest MAC Address | Dest VLAN TAG | Switch Fabric Output Port |
|---|---|---|
| Eth0 | * | 1 |
| Eth1 | * | 2 |
| Eth2 | 1 | 3 |
| Eth3 | 1 | 4 |
| Eth4 | 2 | 5 |
| Eth5 | 2 | 6 |
| Eth6 | * | 7 |
| Eth7 | * | 8 |
| Eth8 | * | 9 |
| Eth9 | * | 10 |
| Broadcast | 1 | 3 |
|  |  | 4 |
| Broadcast | 2 | 5 |
|  |  | 6 |

In Table 7, the left hand column includes destination Ethernet addresses that may be inserted in Ethernet frames sent over switching fabric 302. The center column includes destination VLAN tags that may be included in the Ethernet frames. The right hand column includes corresponding switch fabric output ports. It can be seen from the last two entries in Table 7 that frames with a VLAN tag of 1 and a broadcast Ethernet address are sent to switch fabric output ports 3 and 4. In FIG. 3, switch fabric output ports 3 and 4 are connected to ATM interfaces corresponding to the first protection group. Similarly, in the last entry of Table 7, Ethernet frames having a destination VLAN tag of 2 and broadcast Ethernet address are replicated to switch fabric output ports 5 and 6. In FIG. 3, switch fabric output ports 5 and 6 correspond to ATM interfaces of the second protection group.

In the VLAN implementation, each voice server may also be configured to address Ethernet frames for egress ATM cells to the VLAN tags corresponding to a protection group. Table 8 shown below illustrates exemplary internal VPI/VCI to VLAN and MAC address mappings at a voice server for a VLAN APS implementation.

TABLE 8

Internal VPI/VCI to VLAN and MAC Address Mappings
at Voice Server for VLAN APS Implementation

| Internal VPI/VCI | Dest VLAN Tag | Dest MAC Addr |
|---|---|---|
| 1/31 | 1 | Broadcast |
| 1/32 | 1 | Broadcast |
| 1/33 | 1 | Broadcast |

In Table 8, the left hand column includes internal VPI/VCI values for egress ATM cells. The center column of Table 8 includes destination VLAN tags to be inserted in outbound Ethernet frames. The right hand column in Table 8 includes destination MAC addresses. It can be seen from Table 8 that Ethernet frames destined for the VPI/VCI combinations corresponding to one of the APS protection groups include a destination VLAN tag of 1 and a broadcast Ethernet address. Using the data illustrated in Table 7, Ethernet switching fabric 302 would replicate these frames to the working and protection ATM interfaces of the first protection group.

Although in the examples described above, VPI/VCI translation is performed at the network ATM network interfaces, the subject matter described herein is not limited to performing VPI/VCI translation at the ATM network interfaces. In an alternate implementation, VPI/VCI translation may be performed at the voice servers.

In addition, in the examples described above, Ethernet switching fabric 302 is configured to replicate egress frames to working and protection interfaces of an APS group. However, the subject matter described herein is not limited to such an implementation. In an alternate implementation, the replication may be performed at the voice server that originates the Ethernet frames.

Although the examples described above relate primarily to providing APS for ATM cells transmitted and received over ATM interfaces of a media gateway, the subject matter described herein is not limited to such an implementation. APS may be implemented for any type of packet data sent or received by a media processing device. APS may be implemented for the IP over Ethernet interfaces of media gateway using the same methods described above for ATM interfaces. For example, IP network interfaces 304 illustrated in FIG. 3 may be replicated in a media gateway to implement APS for Ethernet or packet over SONET (PoS) communications with external nodes. Ethernet switching fabric 302 and/or voice servers 308 may be configured to replicate egress packets to the working and protection interfaces of each protection group, in the same manner as that described above for ATM network interfaces. Similarly, ingress packets received at the working packet network interface may be sent to the appropriate voice server, while ingress packets received at the protection interface may be discarded. Switching from the working to the protection interface may occur in the same manner as described above with respect to FIG. 5.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for implementing automatic protection switching (APS) in a device having an Ethernet switching fabric, the method comprising:
   (a) configuring first and second packet network interfaces of a device containing an Ethernet protocol switching fabric and a voice server to respectively function as working and protection APS interfaces of an APS group;
   (b) configuring the Ethernet switching fabric to replicate egress media packets from the voice server to the working and protection APS interfaces, such that identical media packets are transmitted from the device to the same network destination by both the working APS interface and the protection APS interface; and
   (c) configuring the voice server to send media packets using an APS implementation scheme recognized by the Ethernet switching fabric, the APS implementation scheme including a multicast implementation scheme, a port mirroring implementation scheme, or a virtual local area network (VLAN) implementation scheme;
   wherein configuring the Ethernet switching fabric to replicate egress media packets from the voice server to the working and protection APS interfaces includes configuring the voice server to encapsulate at least one ATM cell intended for one of the working and protection APS interfaces in an Ethernet frame addressed to a VLAN corresponding to the working and protection APS interfaces and to a broadcast Ethernet address and configuring the Ethernet switching fabric to replicate Ethernet frames addressed to the VLAN and the broadcast Ethernet address to the working and protection APS interfaces.

2. The method of claim 1 wherein configuring first and second packet network interfaces of a device having an Ethernet switching fabric to respectively function as working and protection APS interfaces includes configuring the first packet network interface to forward ingress media packets to the voice server and configuring the second packet network interface to discard ingress media packets.

3. The method of claim 1 wherein configuring first and second packet network interfaces of a device having an Ethernet switching fabric to respectively function as working and protection APS interfaces includes configuring the first and second packet network interfaces to forward ingress media packets to the voice server and wherein the method further comprises configuring the voice server to discard media packets received from the second packet network interface.

4. The method of claim 1 wherein configuring the Ethernet switching fabric to replicate egress media packets from the voice server to the working and protection APS interfaces includes configuring the voice server to encapsulate at least one media packet intended for the working and protection APS interfaces in an Ethernet frame having a multicast Ethernet address and configuring the Ethernet switching fabric to forward Ethernet frames addressed to the multicast Ethernet address to the working and protection APS interfaces.

5. The method of claim 1 wherein configuring the Ethernet switching fabric to replicate egress media packets from the voice server to the working and protection APS interfaces includes configuring the voice server to encapsulate at least one media packet in an Ethernet frame addressed to one of the working and protection APS interfaces and using a port mirroring function of the Ethernet switching fabric to replicate Ethernet frames addressed to the working APS interface to the protection APS interface.

6. The method of claim 1 wherein configuring the Ethernet switching fabric to replicate egress media packets from the voice server to the working and protection APS interfaces includes configuring the voice server to encapsulate at least one media packet in an Ethernet frame addressed to one of the working and protection APS interfaces and using a port mirroring function of the Ethernet switching fabric to replicate Ethernet frames addressed to the protection APS interface to the working APS interface.

7. The method of claim 1 wherein the device comprises one of a media gateway and an ATM switch.

8. The method of claim 1 wherein configuring first and second packet network interfaces includes configuring first and second ATM network interfaces.

9. The method of claim 1 wherein configuring first and second network interfaces includes configuring first and second packet over SONET network interfaces.

10. The method of claim 1 wherein configuring first and second packet network interfaces includes configuring first and second IP over Ethernet network interfaces.

11. A method for providing automatic protection switching (APS) of media packets in a device having an Ethernet switching fabric, the method comprising:
   (a) sending, using a voice server, media packets to an Ethernet protocol switching fabric using an APS implementation scheme recognized by the Ethernet switching fabric, the APS implementation scheme including a multicast implementation scheme, a port mirroring implementation scheme, or a virtual local area network (VLAN) implementation scheme;

(b) replicating, using the Ethernet switching fabric contained within a device, egress media packets from the voice server of the device to working and protection APS interfaces of an APS group of the device, wherein identical media packets are transmitted from the device to the same network destination by both the working APS interface and the protection APS interface; and (c) receiving ingress media packets at the working and protection APS interfaces and forwarding the ingress media packets received at the working APS interface to the voice server via the Ethernet switching fabric;

wherein replicating egress media packets includes encapsulating at least one ATM cell in an Ethernet frame addressed to a VLAN corresponding to the working and protection APS interfaces and to a broadcast Ethernet address and broadcasting the Ethernet frame to members of the VLAN.

12. The method of claim 11 wherein replicating egress media packets includes encapsulating at least one media packet intended for the working and protection APS interfaces in an Ethernet frame having a multicast Ethernet address, and multicasting the frame to the working and protection APS interfaces.

13. The method of claim 11 wherein replicating egress media packets includes encapsulating at least one media packet in an Ethernet frame addressed to one of the working and protection APS interfaces and using a port mirroring function of the Ethernet switching fabric to replicate the frame to the working and protection APS interfaces.

14. The method of claim 11 comprising discarding the ingress media packets received at the protection APS interface.

15. The method of claim 11 comprising forwarding the ingress media packets received at the protection APS interface to the voice server and, at the voice server, discarding the ingress media packets received from the protection APS interface.

16. The method of claim 11 wherein the device comprises a media gateway.

17. The method of claim 11 wherein the device comprises an ATM switch.

18. The method of claim 11 wherein the media packets comprise at least one of ATM cells and IP packets.

19. A device for implementing automatic protection switching for ATM cells sent over an Ethernet protocol switching fabric, the device comprising:

(a) a first packet network interface being configured to function as a working automatic protection switching (APS) interface of an APS group;

(b) a second packet network interface being configured to function as a protection APS interface of the APS group;

(c) a voice server for processing media packets received via the working APS interface, the voice server configured to send media packets using an APS implementation scheme recognized by the Ethernet switching fabric, the APS implementation scheme including a multicast implementation scheme, a port mirroring implementation scheme, or a virtual local area network (VLAN) implementation scheme; and (d) the Ethernet switching fabric for forwarding media packets between the working and protection APS interfaces and the voice server, wherein the working APS interface is configured to forward ingress media packets to the voice server via the Ethernet switching fabric and wherein the Ethernet switching fabric is configured to replicate egress media packets to the working and protection APS interfaces, such that identical media packets are transmitted from the device to the same network destination by both the working APS interface and the protection APS interface;

wherein the voice server is adapted to encapsulate at least one egress ATM cell in an Ethernet frame including a VLAN identifier corresponding to the APS group and including a broadcast Ethernet address and wherein the Ethernet switching fabric is configured to replicate the Ethernet frame to Ethernet switching fabric ports corresponding to the VLAN.

20. The device of claim 19 wherein the voice server is adapted to encapsulate at least one egress media packet in an Ethernet frame addressed to a multicast address corresponding to the working and protection APS interfaces and wherein the Ethernet switching fabric is adapted to replicate the Ethernet frame addressed to the multicast address to ports corresponding to the working and protection APS interfaces.

21. The device of claim 19 wherein the voice server is adapted to encapsulate at least one egress media packet in an Ethernet frame addressed to one of the working and protection APS interfaces and wherein the Ethernet switching fabric is adapted to implement port mirroring among Ethernet switching fabric ports corresponding to the working and protection APS interfaces.

22. The device of claim 19 wherein elements (a)-(d) are components of a media gateway.

23. The device of claim 19 wherein elements (a)-(d) are components of an ATM switch.

24. The device of claim 19 wherein the media packets comprise at least one of ATM cells and IP packets.

25. A computer program product comprising computer-executable instructions embodied in a non-transitory computer-readable medium for performing steps comprising:

(a) configuring first and second packet network interfaces of a device containing an Ethernet protocol switching fabric and a voice server to respectively function as working and protection automatic protection switching system (APS) interfaces of an APS group; and (b) configuring the Ethernet switching fabric to replicate egress media packets from the voice server to the working and protection APS interfaces, such that identical media packets are transmitted from the device to the same network destination by both the working APS interface and the protection APS interface; and (c) configuring the voice server to send media packets using an APS implementation scheme recognized by the Ethernet switching fabric, the APS implementation scheme including a multicast implementation scheme, a port mirroring implementation scheme, or a virtual local area network (VLAN) implementation scheme;

wherein configuring the Ethernet switching fabric to replicate egress media packets from the voice server to the working and protection APS interfaces includes configuring the voice server to encapsulate at least one ATM cell intended for one of the working and protection APS interfaces in an Ethernet frame addressed to a VLAN corresponding to the APS group and to a broadcast Ethernet address and configuring the Ethernet switching fabric to replicate Ethernet frames addressed to the VLAN and the broadcast Ethernet address to members of the APS group.

26. The computer program product of claim 25 wherein configuring first and second packet network interfaces of a device having an Ethernet switching fabric to respectively function as working and protection APS interfaces includes configuring the first packet network interface to forward ingress media packets to the voice server and configuring the second packet network interface to discard ingress media packets.

27. The computer program product of claim 25 wherein configuring first and second packet network interfaces of a device having an Ethernet switching fabric to respectively function as working and protection APS interfaces includes configuring the first and second packet network interfaces to forward ingress media packets to the voice server and wherein the method further comprises configuring the voice server to discard media packets received from the second packet network interface.

28. The computer program product of claim 25 wherein configuring the Ethernet switching fabric to replicate egress media packets from the voice server to the working and protection APS interfaces includes configuring the voice server to encapsulate at least one media packet intended for the working and protection APS interfaces in an Ethernet frame having a multicast Ethernet address and configuring the Ethernet switching fabric to forward Ethernet frames addressed to the multicast Ethernet address to the working and protection APS interfaces.

29. The computer program product of claim 25 wherein configuring the Ethernet switching fabric to replicate egress media packets from the voice server to the working and protection APS interfaces includes configuring the voice server to encapsulate at least one media packet in an Ethernet frame addressed to one of the working and protection APS interfaces and using a port mirroring function of the Ethernet switching fabric to replicate Ethernet frames addressed to the working APS interface to the protection APS interface.

30. The computer program product of claim 25 wherein configuring the Ethernet switching fabric to replicate egress media packets from the voice server to the working and protection APS interfaces includes configuring the voice server to encapsulate at least one media packet in an Ethernet frame addressed to one of the working and protection APS interfaces and using a port mirroring capability of the Ethernet switching fabric to replicate Ethernet frames addressed to the protection APS interface to the working APS interface.

31. The computer program product of claim 25 wherein the steps are implemented in a media gateway.

32. The computer program product of claim 25 wherein the steps are implemented in an ATM switch.

33. The computer program product of claim 25 wherein the media packets comprise at least one of ATM cells and IP packets.

34. A computer program product comprising computer-executable instructions embodied in a non-transitory computer-readable medium for performing steps comprising:

(a) sending, using a voice server, media packets to an Ethernet protocol switching fabric using an APS implementation scheme recognized by the Ethernet switching fabric, the APS implementation scheme including a multicast implementation scheme, a port mirroring implementation scheme, or a virtual local area network (VLAN) implementation scheme;

(b) replicating, by the Ethernet switching fabric within a device, egress media packets from a voice server of the device to working and protection automatic protection switching (APS) interfaces of an APS group of the device, such that identical media packets are transmitted from the device to the same network destination by both the working APS interface and the protection APS interface; and (c) receiving ingress media packets at the working and protection APS interfaces and forwarding the ingress media packets received at the working APS interface to the voice server via the Ethernet switching fabric;

wherein replicating egress media packets includes encapsulating at least one ATM cell in an Ethernet frame addressed to a VLAN corresponding to the working and protection APS interfaces and to a broadcast Ethernet address and broadcasting the Ethernet frame to members of the VLAN.

35. The computer program product of claim 34 wherein replicating egress media packets includes encapsulating at least one media packet intended for the working and protection APS interfaces in an Ethernet frame having a multicast Ethernet address, a multicasting the frame to the working and protection APS interfaces.

36. The computer program product of claim 34 wherein replicating egress media packets includes encapsulating at least one media packet in an Ethernet frame addressed to one of the working and protection APS interfaces and using a port mirroring function of the Ethernet switching fabric to replicate the frame to the working and protection APS interfaces.

37. The computer program product of claim 34 comprising discarding the ingress media packets received at the protection APS interface.

38. The computer program product of claim 34 comprising forwarding the ingress media packets received at the protection APS interface to the voice server and, at the voice server, discarding the ingress ATM cells received from the protection APS interface.

39. The computer program product of claim 34 wherein the device comprises one of a media gateway and an ATM switch.

40. The computer program product of claim 34 wherein the ingress and egress media packets comprise ATM cells.

41. The computer program product of claim 34 wherein the ingress and egress media packets comprise IP packets.

* * * * *